United States Patent
Han

(10) Patent No.: US 11,394,880 B2
(45) Date of Patent: Jul. 19, 2022

(54) EDGE-BASED SHARPNESS STRENGTH CONTROL CIRCUIT, IMAGE SENSING DEVICE AND OPERATION METHOD OF THE SAME

(71) Applicant: SK hynix Inc., Gyeonggi-do (KR)

(72) Inventor: Ji Hee Han, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 17 days.

(21) Appl. No.: 17/141,283

(22) Filed: Jan. 5, 2021

(65) Prior Publication Data

US 2022/0021806 A1    Jan. 20, 2022

(30) Foreign Application Priority Data

Jul. 17, 2020 (KR) .................. 10-2020-0089002

(51) Int. Cl.
| | |
|---|---|
| *H04N 5/232* | (2006.01) |
| *G06T 5/00* | (2006.01) |
| *G06T 7/13* | (2017.01) |
| *H04N 5/14* | (2006.01) |
| *H04N 5/217* | (2011.01) |
| *H04N 5/21* | (2006.01) |
| *H04N 5/369* | (2011.01) |

(52) U.S. Cl.
CPC ......... *H04N 5/23229* (2013.01); *G06T 5/002* (2013.01); *G06T 5/003* (2013.01); *G06T 7/13* (2017.01); *H04N 5/142* (2013.01); *H04N 5/217* (2013.01)

(58) Field of Classification Search
CPC .... H04N 5/23229; H04N 5/142; H04N 5/217; H04N 5/21; H04N 5/369; G06T 5/002; G06T 5/003; G06T 7/13
See application file for complete search history.

(56) References Cited

U.S. PATENT DOCUMENTS

| | | | |
|---|---|---|---|
| 2016/0165096 A1* | 6/2016 | Suzuki | H04N 1/4092 |
| | | | 382/266 |
| 2019/0045193 A1* | 2/2019 | Socek | H04N 19/23 |
| 2020/0126199 A1* | 4/2020 | Lin | G06T 5/20 |

FOREIGN PATENT DOCUMENTS

| | | |
|---|---|---|
| KR | 10-2011-0091838 | 8/2011 |
| KR | 10-2019-0076998 | 7/2019 |

* cited by examiner

*Primary Examiner* — Christopher K Peterson
(74) *Attorney, Agent, or Firm* — IP & T Group LLP

(57) ABSTRACT

An edge-based sharpness strength control circuit include a first edge determination unit suitable for determining each of multiple regions in a pixel array to be an edge region having edge information on pixel data of the corresponding region or a flat region having flat information on pixel data of the corresponding region, the pixel array including a plurality of pixels; a second edge determination unit suitable for determining each edge region to be a step edge region having directional information within the corresponding edge region or a texture edge region having non-directional information within the corresponding edge region; and a noise removing unit suitable for removing noise from each step edge region using a first filter and for removing noise from each texture edge region using a second filter having a different gain than that of the first filter.

20 Claims, 8 Drawing Sheets

EDGE-BASED SHARPNESS STRENGTH CONTROL CIRCUIT, IMAGE SENSING DEVICE AND OPERATION METHOD OF THE SAME

CROSS-REFERENCE TO RELATED APPLICATION

This patent application claims priority under 35 U.S.C. § 119 on Korean Patent Application No. 10-2020-0089002, filed on Jul. 17, 2020, which is herein incorporated by reference in its entirety.

TECHNICAL FIELD

Various embodiments of the present invention generally relate to a semiconductor device. Particularly, various embodiments relate to an edge-based sharpness strength control circuit for controlling edge-based sharpness strength, an image sensing device and an operation method of the same.

BACKGROUND

Recently, the computer environment paradigm has shifted to ubiquitous computing, which enables a computer system to be used virtually anytime, everywhere. As a result, use of portable electronic devices such as mobile phones, digital cameras, notebook computers and the like has been rapidly increasing.

Recently, due to the rapid development of display devices, the development of image photographing devices having image sensors, such as cameras and camcorders, has accelerated. An image photographing device can photograph an image and record the photographed image in a recording medium, and reproduce the recorded image at any time. Accordingly, as use of image photographing devices has increased, the demand for more functionality in the image photographing device has also increased. Specifically, in addition to compact size, reduced weight, and lower power consumption, an image photographing device with higher capability functionality as well as multi-functions is desirable.

SUMMARY

Embodiments of the present invention are directed to an edge-based sharpness strength control circuit for controlling sharpness strength of edge regions, an image sensing device and an operation method of the same, capable of removing a noise and improving the sharpness of image by determining an edge region of the pixel data outputted from a plurality of pixels as a step edge region or a texture edge region according to an edge direction of the pixel data.

In an embodiment, an edge-based sharpness strength control circuit may include a first edge determination unit suitable for determining each of multiple regions in a pixel array to be an edge region having edge information on pixel data of the corresponding region or a flat region having flat information on pixel data of the corresponding region, the pixel array including a plurality of pixels; a second edge determination unit suitable for determining each edge region to be a step edge region having directional information within the corresponding edge region or a texture edge region having non-directional information within the corresponding edge region; and a noise removing unit suitable for removing noise from each step edge region using a first filter and for removing noise from each texture edge region using a second filter having a different gain than that of the first filter.

The first edge determination unit may determine each region to be an edge region when a standard deviation of the pixel data of neighboring pixels within the corresponding region is greater than a reference value, and to be a flat region when the standard deviation of the pixel data of the neighboring pixels within the corresponding region is less than the reference value, and the second edge determination unit may determine each edge region to be a step edge region when a total number of directional changes in the edge region is less than a set value, and to be a texture edge region when the total number of direction changes in the edge region is greater than the set value.

The second edge determination unit may determine each step edge region to be a strong step edge region when a difference value among the neighboring pixels within the corresponding step edge region is greater than a fixed value, and to be a weak step edge region when the difference value among the neighboring pixels within the corresponding step edge region is less than the fixed value.

The second edge determination unit may determine each texture edge region to be a strong texture edge region when a difference value among the neighboring pixels within the corresponding texture edge region is greater than the fixed value, and to be a weak texture edge region when the difference value among the neighboring pixels within the corresponding texture edge region is less than the fixed value.

The noise removing unit may remove noise from each texture edge region using a high-gain high-frequency filter and removes noise from each step edge region using a low-gain high-frequency filter.

The low-gain high-frequency filter may increase sharpness strength by subtracting a blurring signal from an original image signal.

The blurring signal may be generated using an average value of the neighboring pixels having a direction that is different than a direction of the corresponding step edge region.

Edge information for each edge region may include at least one of horizontal direction information, vertical direction information, diagonal left direction information and diagonal right direction information.

In another embodiment, an image sensing device may include an image sensor including a pixel array having a plurality of pixels; and an image signal processor suitable for processing signal output from the image sensor, wherein one of the image sensor and image signal processor includes an edge-based sharpness strength control circuit that comprises a first edge determination unit suitable for determining each of multiple regions in a pixel array to be an edge region having edge information or a flat region having flat information on pixel data of the corresponding region, the pixel array including a plurality of pixels; a second edge determination unit suitable for determining each edge region to be a step edge region having directional information or a texture edge region having non-directional information within the corresponding edge region; and a noise removing unit suitable for removing noise from each step edge region using a first filter and for removing noise from each texture edge region using a second filter having a different gain than that of first filter.

The second edge determination unit may determine each step edge region to be a strong step edge region when a difference value among the neighboring pixels within the corresponding step edge region is greater than a fixed value, and to be a weak step edge region when the difference value among the neighboring pixels within the corresponding step edge region is less than the fixed value.

The second edge determination unit may determine each texture edge region to be a strong texture edge region when a difference value among the neighboring pixels within the corresponding texture edge region is greater than the fixed value, and to be a weak texture edge region when the difference value among the neighboring pixels within the corresponding texture edge region is less than the fixed value.

The noise removing unit may remove noise from each texture edge region using a high-gain high-frequency filter, and removes noise from each step edge region using a low-gain high-frequency filter.

The low-gain high-frequency filter may increase a sharpness strength by subtracting a blurring signal from an original image signal.

The blurring signal may be generated using an average value of the neighboring pixels having a direction that is different than a direction of the corresponding step edge region.

In another embodiment, an operation method of an image sensing device may include determining each of multiple regions in a pixel array to be an edge region when a standard deviation of the pixel data of neighboring pixels within the corresponding region is greater than a reference value, and to be a flat region when the standard deviation of the pixel data of the neighboring pixels within the corresponding region is less than the reference value; determining each edge region to be a step edge region when a total number of directional changes in the corresponding edge region is less than a set value, and to be a texture edge region when the total number of direction changes in the corresponding edge region is greater than the set value; and removing noise from each step edge region using a first filter and for removing noise from each texture edge region using a second filter having a different gain than that of the first filter.

The operation may further include determining each step edge region to be a strong step edge region when a difference value among the neighboring pixels within the corresponding step edge region is greater than a fixed value, and to be a weak step edge region when the difference value among the neighboring pixels within the corresponding step edge region is less than the fixed value.

The operation may further include determining each texture edge region to be a strong texture edge region when a difference value among the neighboring pixels within the corresponding texture edge region is greater than the fixed value, and to be a weak texture edge region when the difference value among the neighboring pixels within the corresponding texture edge region is less than the fixed value.

In removing noise, noise is removed from each texture edge region using a high-gain high-frequency filter and noise is removed from each step edge region using a low-gain high-frequency filter.

The low-gain high-frequency filter may increase sharpness strength by subtracting a blurring signal from an original image signal.

Each edge region may be associated with at least one of horizontal direction information, vertical direction information, diagonal left direction information and diagonal right direction information, and the blurring signal may be generated using an average value of the neighboring pixels having a direction that is different than a direction of the corresponding step edge region.

In another embodiment, an operation method of an image sensing device may include removing, from an original image signal, noise from a step edge region, in which a standard deviation of pixel data of neighboring pixels is greater than a first threshold and a total number of directional changes is less than a second threshold, using a first filter that subtracts a blurring signal from the original image signal; and processing the noise-removed signal.

The operating method may further include removing, from the original image signal, noise from a texture edge region, in which the standard deviation is greater than the first threshold and the total number of directional changes is not less than the second threshold, using a second filter.

The second filter has a different gain than that of the first filter.

The first filter may be a low-gain high-frequency filter and the second filter may be a high-gain high frequency filter.

The low-gain high-frequency filter may increase sharpness strength by subtracting a blurring signal from an original image signal.

These and other features and advantages of the present invention will become understood by those with ordinary skill in the art of the present invention from the following drawings and detailed description.

BRIEF DESCRIPTION OF THE DRAWINGS

The description herein makes reference to the accompanying drawings wherein like reference numerals refer to like parts throughout the several views.

DETAILED DESCRIPTION

Figure 1:
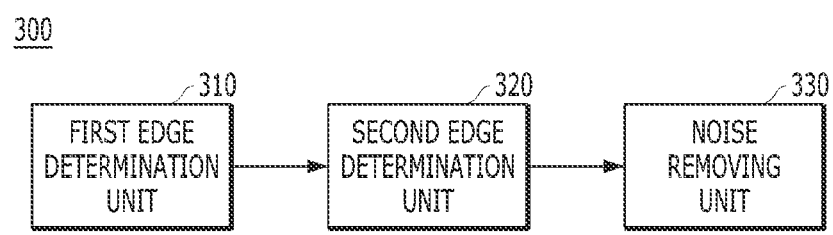
FIG. 1 is a block diagram illustrating an edge-based sharpness strength control circuit in accordance with an embodiment of the present invention.

Various examples of the present invention are described below in more detail with reference to the accompanying drawings. The invention may be realized in other ways, forms and variations of disclosed embodiments and thus should not be construed as being limited to the embodiments set forth herein. Rather, the described embodiments are provided so that this present invention is thorough and complete and fully conveys the present invention to those skilled in the art to which this invention pertains. Throughout the specification, reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance may be referred to as a second or third element in another instance without indicating any change in the element itself.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements. Communication between two elements, whether directly or indirectly connected/coupled, may be wired or wireless, unless the context indicates otherwise. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise. The articles 'a' and 'an' as used in this application and the appended claims should generally be construed to mean 'one or more' unless specified otherwise or it is clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the present invention and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the present invention are described in detail with reference to the accompanied drawings.

Hereinafter, an edge-based sharpness strength control circuit is described with reference to FIGS. 1 to 4.

Figure 2:
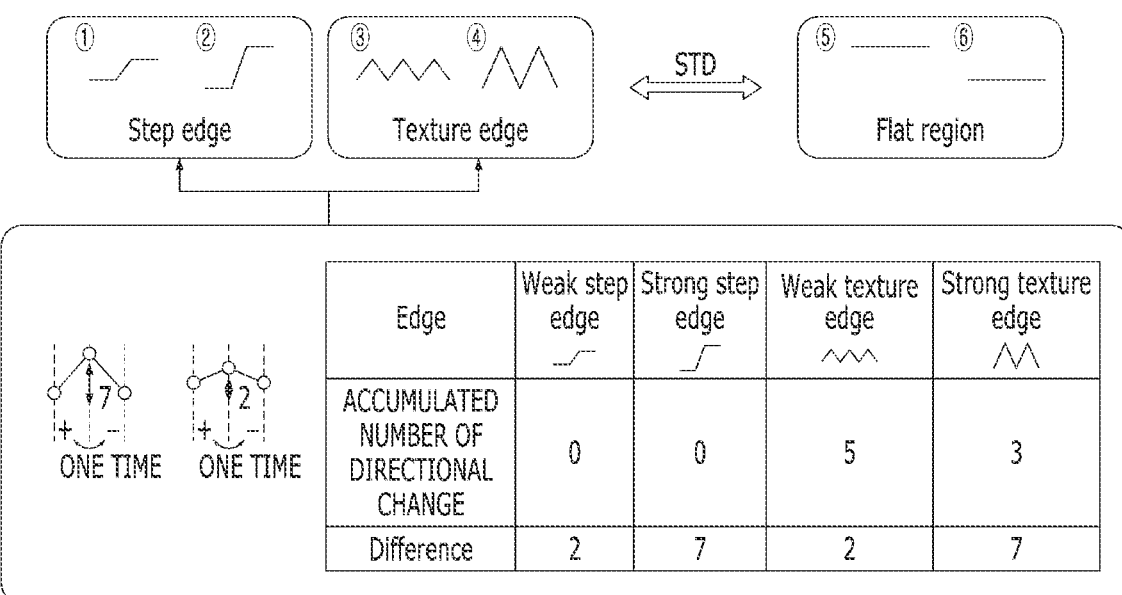
FIG. 2 is a diagram illustrating determination of a step edge region and a texture edge region according to a second edge determination unit, such as that shown in FIG. 1.
Figure 3:
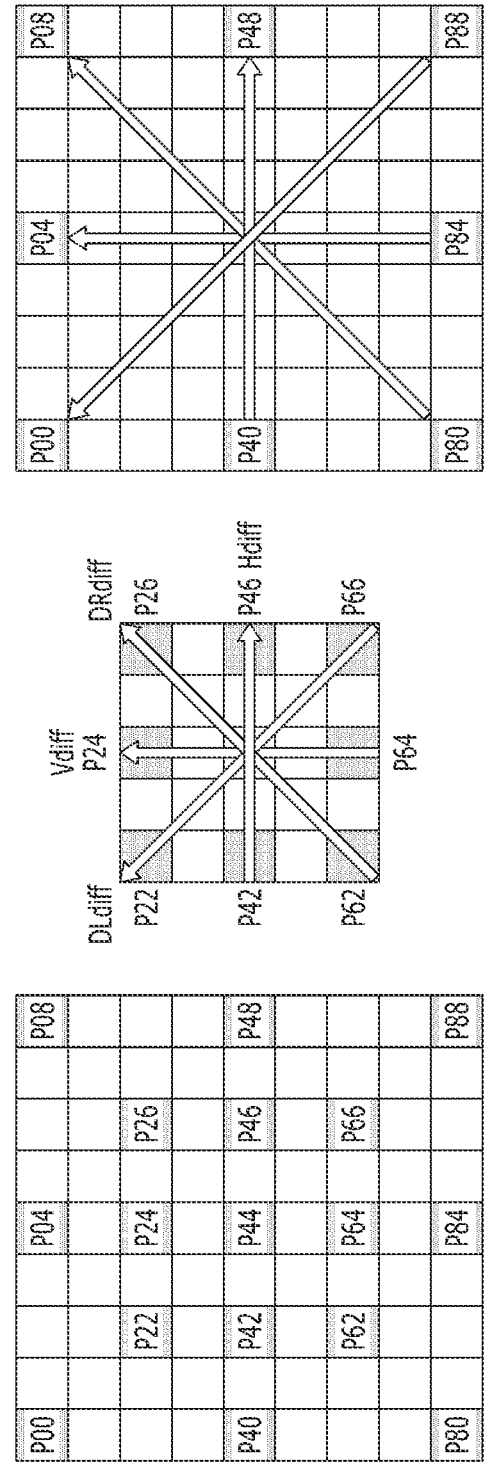
FIG. 3 is a diagram illustrating a direction of an edge region.
Figure 4:
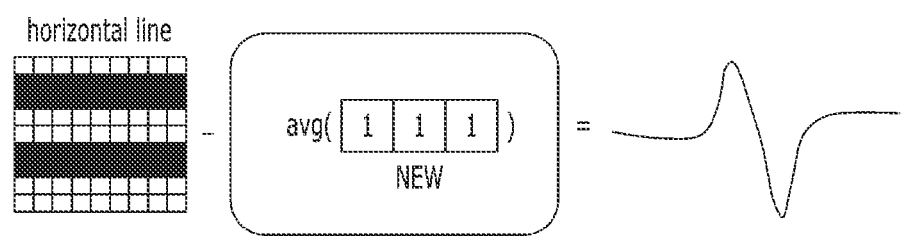
FIG. 4 is a diagram illustrating removing noise from a digital representation, such as an image, using a noise removing unit, such as that shown in FIG. 1.

FIG. 1 is a block diagram illustrating an edge-based sharpness strength control circuit configured to control edge-based sharpness strength in accordance with an embodiment of the present invention. FIG. 2 is a diagram illustrating determination of whether an edge region is a step edge region or a texture edge region according to a second edge determination unit shown in FIG. 1. FIG. 3 is a diagram illustrating a direction of an edge region. FIG. 4 is a diagram illustrating removing noise using a noise removing unit shown in FIG. 1.

Referring to FIG. 1, an edge-based sharpness strength control circuit 300 may include a first edge determination unit 310, a second edge determination unit 320 and a noise removing unit 330.

The first edge determination unit 310 may determine a region as an edge region having edge information or a flat region having flat information on pixel data outputted from a plurality of pixels included in a pixel array.

As shown in FIG. 2, the first edge determination unit 310 may determine each of multiple regions as an edge region when a standard deviation (STD) of the pixel data of neighboring pixels within the corresponding region is greater than a reference value, and as a flat region when the standard deviation of the pixel data of the neighboring pixels within the region is less than the reference value. The reference value may be determined as an average value of green pixels among neighboring pixels within the corresponding region. In another embodiment, the reference value may be set based a brightness value of the corresponding region.

The second edge determination unit 320 may determine each edge region as either a step edge region having directional information or a texture edge region having non-directional information according to a direction of the corresponding edge region. Herein, a step edge region indicates an edge region having a definite direction, and a texture edge region indicates a region having non-directional information such as grass, a desk pattern and/or a stone pattern.

An edge region may be determined to be a step edge region when the total (or accumulated) number of directional changes in the edge region is less than a set value, and an edge region may be determined to be a texture edge region when the total number of direction changes in the edge region is greater than the set value.

For example, as shown in FIG. 2, if the total number of directional changes in an edge region is "0", that edge region is determined to be a step edge region. If the total number of directional changes in an edge region is "5" or "3", that edge region is determined to be a texture edge region.

Each step edge may be further classified as a strong step edge region or a weak step edge region by a second edge determination unit 320. A strong step edge region is determined when a difference value among the neighboring pixels within the corresponding step edge region is greater than a fixed value, and a weak step edge region is determined when the difference value among the neighboring pixels within the corresponding step edge region is less than the fixed value.

Also, the second edge determination unit 320 may classify each texture edge region as either a strong texture edge region or a weak texture edge region.

A strong texture edge region may be determined when a difference value among the neighboring pixels within the corresponding texture edge region is greater than the fixed value, and a weak texture edge region may be determined when the difference value among the neighboring pixels within the corresponding texture edge region is less than the fixed value.

For example, as shown in FIG. 2, if the difference of the directional changes in a texture edge region is "7", the texture edge region may be determined to be a strong texture edge region. If the difference of the directional changes in a texture edge region is "2", the texture edge region may be determined to be a weak texture edge region.

Herein, referring to FIG. 3, the direction of an edge region may be classified as a horizontal direction, a vertical direction, a diagonal left (DL) direction or a diagonal right (DR) direction.

A gradient of each direction may be calculated using a sum of absolute difference to reduce simplify calculation. 'DLdiff' indicates an absolute difference of the diagonal left direction, 'Vdiff' indicates an absolute difference of the vertical direction, 'DRdiff' indicates an absolute difference of the diagonal right direction, and 'Hdiff' indicates an absolute difference of the horizontal direction.

For example, when equation 1 below is satisfied, the direction of an edge region may be determined to be the diagonal right direction.

$$A\&B\&(C|D), \quad \text{[Equation 1]}$$

where 'A' indicates |DL_Gra−DR_Gra|>Th, 'DL_Gra' indicates a gradient value of the diagonal left direction, 'DR_Gra' indicates a gradient value of the diagonal right direction, 'Th' indicates a threshold value, 'B' indicates |DL_Gra−DR_Gra|−|H_Gra−V_Gra|<Th, 'H_Gra' indicates a gradient value of the horizontal direction, 'V_Gra' indicates of a gradient value of the vertical direction, 'C' indicates Max (H_Gra, V_Gra, DL_Gra, DR_Gra) !=DR_Gra, and 'D' indicates Min (H_Gra, V_Gra, DL_Gra, DR_Gra)==DR_Gra.

When equation 2 is satisfied, the direction of an edge region may be determined to be the diagonal left direction.

$$A\&B\&(C1|D1), \quad \text{[Equation 2]}$$

where 'C1' indicates Max (H_Gra, V_Gra, DL_Gra, DR_Gra) !=DL_Gra, and 'D1' indicates Min (H_Gra, V_Gra, DL_Gra, DR_Gra)==DL_Gra.

When equation 3 is satisfied, the direction of an edge region may be determined to be the horizontal direction.

$$A1\&E\&D2, \quad \text{[Equation 3]}$$

where 'A1' indicates |DL_Gra−DR_Gra|<Th, 'E' indicates V_gra−H_Gra>Th, and 'D2' indicates Min (H_Gra, V_Gra, DL_Gra, DR_Gra)==H_Gra.

When equation 4 is satisfied, the direction of an edge region may be determined to be the vertical direction.

$$A1\&E1\&D3, \quad \text{[Equation 4]}$$

where 'E1' indicates H_gra−V_Gra>Th, and 'D3' indicates Min (H_Gra, V_Gra, DL_Gra, DR_Gra)==V_Gra.

The noise removing unit 330 may remove noise from a step edge region and from a texture edge region using different filters respectively, and improve the sharpness.

More specifically, the noise removing unit 330 may remove noise from a texture edge region using a high-gain high-frequency filter such as "Laplacian Filter". Also, the noise removing unit 330 may remove noise from a step edge region using a low-gain high-frequency filter.

The low-gain high-frequency filter may generate the sharpness signal by subtracting a blurring signal from an original image signal and improve the strength of the sharpness.

Herein, the blurring signal may be generated using an average value of the neighboring pixels having the same direction as the direction of the corresponding step edge region.

For example, the sharpness signal may be generated by subtracting the corresponding average value from the horizontal line shown in FIG. 4. Through this process, neighboring dot noise of the edge step region may be removed and a detailed image may be obtained.

Detailed description of removing noise of a flat region is omitted because such noise removal is widely known to those skilled in the art.

Figure 5:
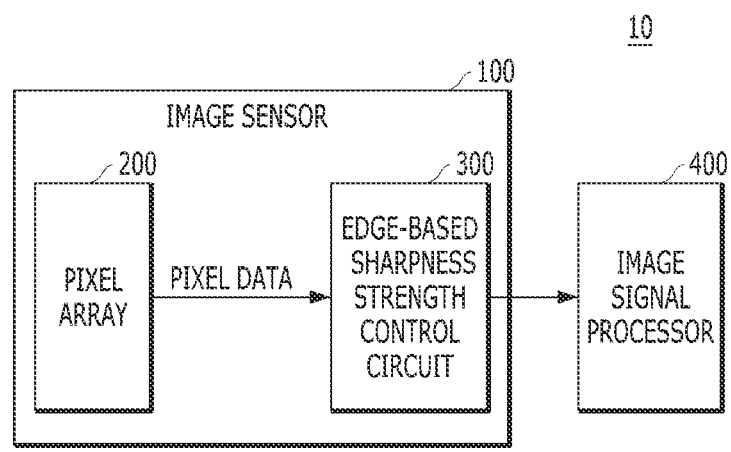
FIG. 5 is a block diagram illustrating an image sensing device employing an edge-based sharpness strength control circuit in accordance with an embodiment of the present invention.

FIG. 5 is a block diagram illustrating an image sensing device in accordance with an embodiment of the present invention.

Referring to FIG. 5, the image sensing device 10 may include an image sensor 100 and an image signal processor (ISP) 400.

The image sensing device 10 may be implemented in any suitable electronic device, such as a personal computer (PC) or a mobile computing device that can receive and process image data.

More specifically, the image sensing device 10 may be implemented in a laptop computer, a mobile phone, a smart phone, a tablet, a personal digital assistant (PDA), an enterprise digital assistant (EDA), a digital still camera, a digital video camera, a portable multimedia player (PMP), a mobile internet device (MID), a wearable computer, as an object in an Internet of things (IoT) network, or as an object in an internet of everything (IoE) network.

The image sensor 100 may include a pixel array 200 and an edge-based sharpness strength control circuit 300.

The pixel array 200 may include a plurality of pixels. Herein, each pixel may represent pixel data, and have an RGB data format, YUV data format, YCbCr data format, or any other data format consistent with the teachings herein.

The edge-based sharpness strength control circuit 300 may output image data having improved sharpness by removing noise from step edge regions and from texture edge regions using different filters having different gains.

The edge-based sharpness strength control circuit 300 may be implemented as shown in FIGS. 1 to 4.

The detailed configuration and operations of the edge-based sharpness strength control circuit 300 are described in detail with reference to FIGS. 1 to 4.

The image signal processor 400 may be implemented in an integrated circuit, a system on chip (SoC) or a mobile application processor. The image signal processor 400 may process an output signal of the image sensor 100. That is, the image signal processor 400 may receive and process an image output signal outputted from the edge-based sharpness strength control circuit 300 of the image sensor 100.

More specifically, the image signal processor 400 may generate RGB image data from a Bayer pattern corresponding to pixel data. For example, the image signal processor 400 may process a Bayer pattern such that the image data is displayed in a display, and may transfer processed image data to an interface for transfer to another unit or device.

In an embodiment, each of the image sensor 100 and the image signal processor 400 may be implemented as a multi-chip package (MCP). In another embodiment, the image sensor 100 and the image signal processor 400 may be implemented as a single chip.

Figure 6:
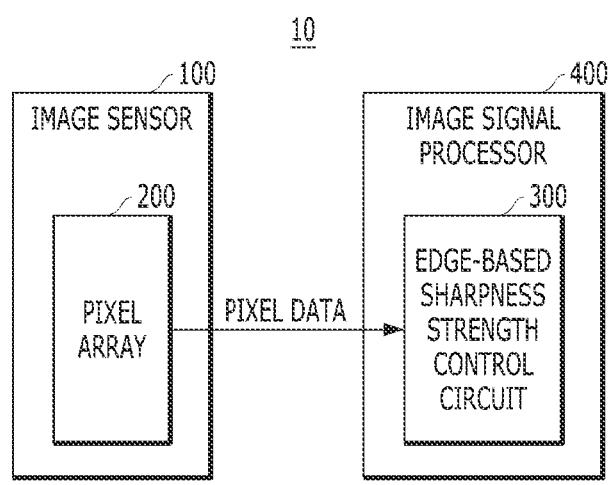
FIG. 6 is a block diagram illustrating an image sensing device employing an edge-based sharpness strength control circuit in accordance with another embodiment of the present invention.

FIG. 6 is a block diagram illustrating an image sensing device in accordance with an embodiment of the present invention.

Referring to FIG. 6, the image sensing device 10 may include an image sensor 100 and an image signal processor (ISP) 400. The image signal processor 400 may include an edge-based sharpness strength control circuit 300.

The edge-based sharpness strength control circuit 300 may be implemented as shown in FIGS. 1 to 4.

The structure and operation of the image sensing device 10 shown in FIG. 6 are substantially the same as the structure and operation of the image sensing device 10 shown in FIG. 5, except that the edge-based sharpness strength control circuit 300 is implemented in the image signal processor 400 instead of in the image sensor 100. Thus, detailed description of the image sensing device 10 of FIG. 6 is omitted.

Figure 7:
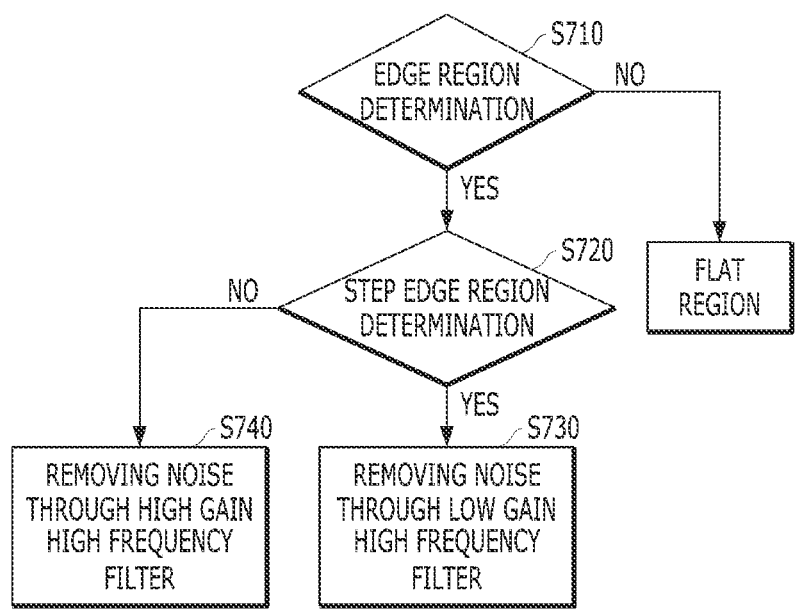
FIG. 7 is a flow chart illustrating an operation of an image sensing device in accordance with another embodiment of the present invention.

Hereinafter, an operation of an image sensing device in accordance with an embodiment of the present invention is described with reference to FIG. 7. FIG. 7 is a flow chart illustrating an operation of an image sensing device (e.g., image sensing device 10 in FIGS. 5 and 6) in accordance with an embodiment of the present invention.

Referring to FIG. 7, the operation of an image sensing device may include an edge region determination operation S710, a step edge region determination operation S720, an operation of removing noise in each step edge region S730 and an operation of removing noise in each texture edge region S740.

At operation S710, each of multiple regions of pixels may be classified as an edge region or a flat region. A region of pixels may be determined to be an edge region when a standard deviation of the pixel data of neighboring pixels within the corresponding region is greater than a reference value, and a region of pixels may be determined to be a flat region when the standard deviation of the pixel data of the neighboring pixels within the corresponding region is less than the reference value.

At operation S720, each edge region identified in operation S720 may be determined to be a step edge region when a total or accumulated number in directional changes of that edge region is less than a set value, or may be determined to be a texture edge region when the total or accumulated number of direction changes that edge region is greater than the set value.

Herein, each step edge region may be determined to be a strong step edge region when a difference value among the neighboring pixels within that step edge region is greater than a fixed value, whereas each step edge region may be determined to be a weak step edge region when the difference value among the neighboring pixels within that step edge region is less than the fixed value.

Each texture edge region also may be classified as strong or weak. In particular, each texture edge region may be determined to be a strong texture edge region when a difference value among the neighboring pixels within that texture edge region is greater than the fixed value, whereas each texture edge region may be determined to be a weak texture edge region when the difference value among the neighboring pixels within that texture edge region is less than the fixed value.

At operation S730, the noise of each step edge region may be removed through use of a low-gain high-frequency filter. Herein, the high-gain high-frequency filter may improve sharpness strength by subtracting the blurring signal from the original image signal.

At operation S740, the noise of each texture edge region may be removed through use of a high-gain high-frequency filter.

Hereinafter, a system configured to implement an image sensing device in accordance with an embodiment of the present invention is described in detail with reference to FIG. 8.

Figure 8:
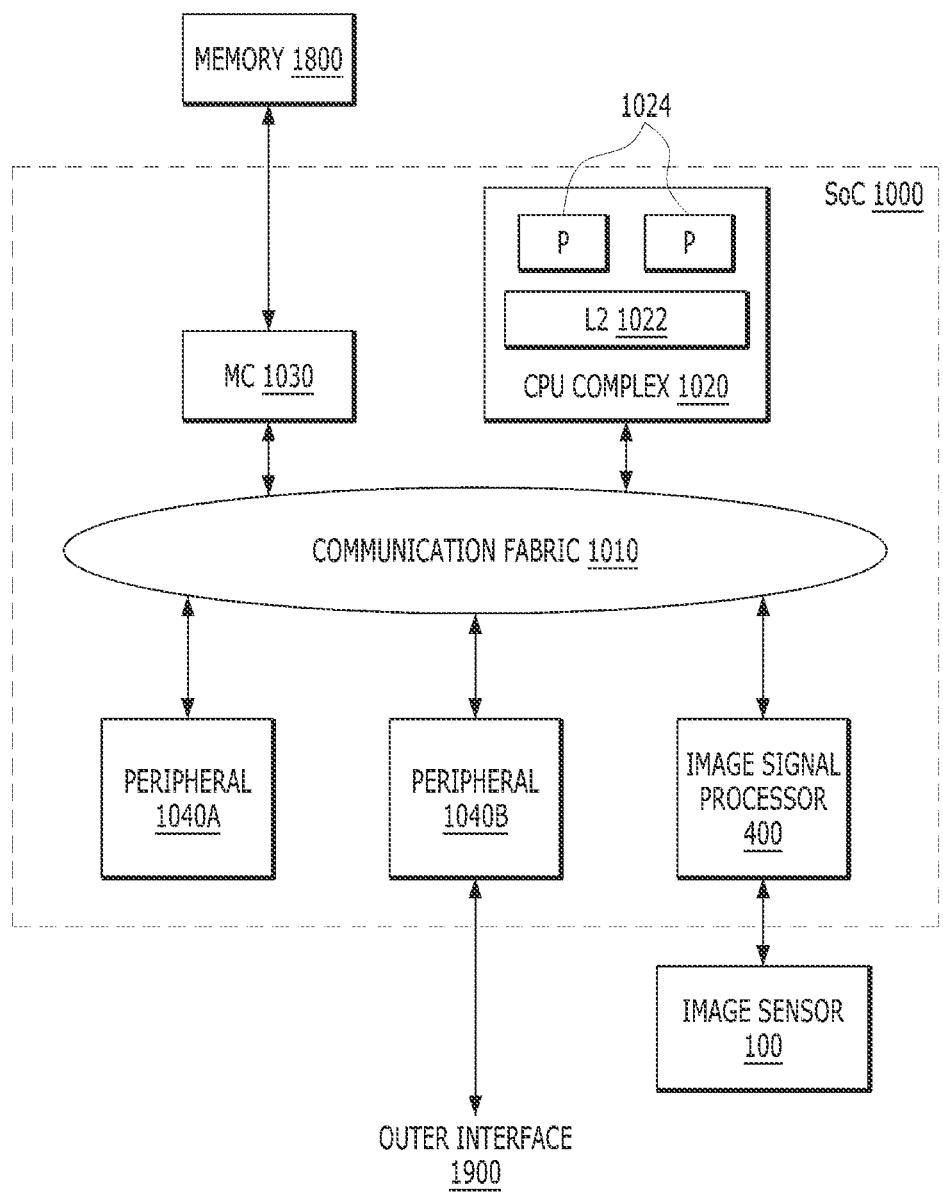
FIG. 8 is a block diagram illustrating a system configured to implement an image sensing device in accordance with an embodiment of the present invention.

FIG. 8 illustrates a system configured to implement an image sensing device in accordance with an embodiment of the present invention.

In various embodiments, the system of FIG. 8 may be any of various types of computing devices, including, but not limited to, a personal computer system, desktop computer, laptop or notebook computer, mainframe computer system, handheld computing device, cellular phone, smartphone, mobile phone, workstation, network computer, a consumer device, application server, storage device, intelligent display, a peripheral device such as a switch, modem, router, etc., or in general any type of computing device. According to an embodiment, the system of FIG. 8 may represent a system-on-a-chip (SoC). The circuits of the SoC 1000 may be integrated onto a single semiconductor substrate as an integrated circuit, i.e., a "chip." In some embodiments, the circuits may be implemented on two or more discrete chips in a system. The SoC 1000 is described as an example herein.

In the illustrated embodiment, the circuits of the SoC 1000 include a central processing unit (CPU) complex 1020, on-chip peripheral circuits 1040A-1040B (individually, "peripheral" and collectively "peripherals"), a memory controller (MC) 1030, a communication fabric 1010, and an image signal processor 400. The SoC 1000 may also be coupled to additional circuits, such as to a memory 1800 and an image sensor 100. The circuits 1020, 1030, 1040A-1040B, and 400 may all be coupled to the communication fabric 1010. The memory controller 1030 may be coupled to the memory 1800, and the peripheral 1040B may be coupled to an outer interface 1900. Additionally, the image signal processor 400 may be coupled to the image sensor 100.

The peripherals 1040A-1040B may be any set of additional hardware functionality in the SoC 1000. For example, the peripherals 1040A-1040B may include display controllers configured to display video data on one or more display devices, graphics processing units (GPUs), video encoder/decoders, scalers, rotators, blenders, etc.

The image signal processor 400 may, in some embodiments, be part of another video peripheral configured to process image capture data from the image sensor 100 (or other image sensor). The image signal processor 400 and the image sensor 100 may be configured to implement the image signal processor 400 and the image sensor 100 shown in FIGS. 1 to 7.

The peripherals 1040A-1040B may also include audio peripherals such as microphones, speakers, interfaces to microphones and speakers, audio processors, digital signal processors, mixers, etc. The peripherals 1040A-1040B (e.g., the peripheral 1040B) may include peripheral interface controllers for various interfaces 1900 external to the SoC 1000 including interfaces such as Universal Serial Bus (USB), peripheral circuit interconnect (PCI) including PCI Express (PCIe), serial and parallel ports, etc. The peripherals 1040A-1040B may further include networking peripherals such as media access controllers (MACs). In general, any set of hardware may be included, according to various embodiments.

The CPU complex 1020 may include one or more processors (Ps) 1024 that serve as the CPU of the SoC 1000.

The processor(s) 1024 may execute the main control software of the system, such as an operating system. Generally, software executed by the CPU may control the other circuits of the system to realize the desired functionality of the system. The processors 1024 may also execute other software, such as application programs. The application programs may provide user functionality and may rely on the operating system for lower level device control. Accordingly, the processors 1024 may also be referred to as application processors. The CPU complex 1020 may further include other hardware such as the L2 cache 1022 and/or an interface to the other circuits of the system (e.g., an interface to the communication fabric 1010).

Generally, a processor may include any circuitry and/or microcode configured to execute instructions defined in an instruction set architecture implemented by the processor. The instructions and data operated on by the processors in response to executing the instructions may generally be stored in the memory 1800, although certain instructions may be defined for direct processor access to peripherals as well. Processors may encompass processor cores implemented on an integrated circuit with other circuits as a system on a chip (SoC 1000) or other levels of integration. Processors may further encompass discrete microprocessors, processor cores and/or microprocessors integrated into multichip module implementations, processors implemented as multiple integrated circuits, etc.

The memory controller 1030 may generally include circuitry for receiving memory operations from other circuits of the SoC 1000 and for accessing the memory 1800 to complete the memory operations. The memory controller 1030 may be configured to access any type of memory 1800. For example, the memory 1800 may be a static random access memory (SRAM), or a dynamic RAM (DRAM) such as synchronous DRAM (SDRAM) including double data rate (DDR, DDR2, DDR3, etc.) DRAM. Low power/mobile versions of the DDR DRAM may be supported (e.g., LPDDR, mDDR, etc.). The memory controller 1030 may include queues for memory operations, for ordering (and potentially reordering) the operations and presenting the operations to the memory 1800. The memory controller 1030 may further include data buffers to store write data awaiting write to memory and read data awaiting return to the source of the memory operation. In some embodiments, the memory controller 1030 may include a memory cache to store recently accessed memory data. In SoC implementations, for example, the memory cache may reduce power consumption in the SoC by avoiding re-access of data from the memory 1800 if it is expected to be accessed again soon. In some cases, the memory cache may also be referred to as a system cache, as opposed to private caches such as the L2 cache 1022 or caches in the processors 1024, which serve only certain circuits. Additionally, in some embodiments, a system cache may be located externally to the memory controller 1030.

In an embodiment, the memory 1800 may be packaged with the SoC 1000 in a chip-on-chip or package-on-package configuration. A multichip module configuration of the SoC 1000 and the memory 1800 may be used as well. Such configurations may be relatively more secure (in terms of data observability) than transmissions to other circuits in the system (e.g., to the end points). Accordingly, protected data may reside in the memory 1800 unencrypted, whereas the protected data may be encrypted for exchange between the SoC 1000 and external endpoints.

The communication fabric 1010 may be any communication interconnect and protocol for communicating among the circuits of the SoC 1000. The communication fabric 1010 may be bus-based, including shared bus configurations, cross bar configurations, and hierarchical buses with bridges. The communication fabric 1010 may also be packet-based, and may be hierarchical with bridges, cross bar, point-to-point, or other interconnects.

It is noted that the number of circuits of the SoC 1000 (and the number of subcircuits within the CPU complex 1020) may vary in different embodiments. There may be more or fewer of each circuit/subcircuit than the number shown in FIG. 6.

In some embodiments, the methods described herein may be implemented by a computer program product, or software. In some embodiments, a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

As described above, an edge-based sharpness strength control circuit, an image sensing device and an operation method of the same in accordance with embodiments of the present invention may improve the sharpness of image by classifying each of multiple edge regions as a step edge region or a texture edge region and removing dot noise.

While the present invention illustrates and describes specific embodiments, it will be apparent to those skilled in the art in light of the present invention that various changes and modifications may be made without departing from the spirit and scope of the invention as defined in the following claims. The present invention encompasses all such changes and modifications to the extent they fall within the scope of the claims.

What is claimed is:

1. An edge-based sharpness strength control circuit, comprising:
   a first edge determination unit suitable for determining each of multiple regions in a pixel array to be an edge region having edge information on pixel data of the corresponding region or a flat region having flat information on pixel data of the corresponding region, the pixel array including a plurality of pixels;
   a second edge determination unit suitable for determining each edge region to be a step edge region having directional information within the corresponding edge region or a texture edge region having non-directional information within the corresponding edge region; and
   a noise removing unit suitable for removing noise from each step edge region using a first filter and for removing noise from each texture edge region using a second filter having a different gain than that of the first filter.

2. The edge-based sharpness strength control circuit of claim 1, wherein the first edge determination unit determines each region to be an edge region when a standard deviation of the pixel data of neighboring pixels within the corresponding region is greater than a reference value, and to be a flat region when the standard deviation of the pixel data of the neighboring pixels within the corresponding region is less than the reference value, and wherein the second edge determination unit determines each edge region to be a step edge region when a total number of directional changes in the edge region is less than a set value, and to be a texture edge region when the total number of direction changes in the edge region is greater than the set value.

3. The edge-based sharpness strength control circuit of claim 2, wherein the second edge determination unit determines each step edge region to be a strong step edge region when a difference value among the neighboring pixels within the corresponding step edge region is greater than a fixed value, and to be a weak step edge region when the difference value among the neighboring pixels within the corresponding step edge region is less than the fixed value.

4. The edge-based sharpness strength control circuit of claim 2, wherein the second edge determination unit determines each texture edge region to be a strong texture edge region when a difference value among the neighboring pixels within the corresponding texture edge region is greater than the fixed value, and to be a weak texture edge region when the difference value among the neighboring pixels within the corresponding texture edge region is less than the fixed value.

5. The edge-based sharpness strength control circuit of claim 1, wherein the noise removing unit removes noise from each texture edge region using a high-gain high-frequency filter and removes noise from each step edge region using a low-gain high-frequency filter.

6. The edge-based sharpness strength control circuit of claim 5, wherein the low-gain high-frequency filter increases sharpness strength by subtracting a blurring signal from an original image signal.

7. The edge-based sharpness strength control circuit of claim 6, wherein the blurring signal is generated using an average value of the neighboring pixels having a direction that is different than a direction of the corresponding step edge region.

8. The edge-based sharpness strength control circuit of claim 1, wherein edge information for each edge region includes at least one of horizontal direction information, vertical direction information, diagonal left direction information and diagonal right direction information.

9. An image sensing device, comprising:
an image sensor including a pixel array having a plurality of pixels;
an image signal processor suitable for processing signal output from the image sensor;
wherein one of the image sensor and image signal processor includes an edge-based sharpness strength control circuit that comprises:
a first edge determination unit suitable for determining each of multiple regions in a pixel array to be an edge region having edge information or a flat region having flat information on pixel data of the corresponding region, the pixel array including a plurality of pixels;
a second edge determination unit suitable for determining each edge region to be a step edge region having directional information or a texture edge region having non-directional information within the corresponding edge region; and
a noise removing unit suitable for removing noise from each step edge region using a first filter and for removing noise from each texture edge region using a second filter having a different gain than that of first filter.

10. The image sensing device of claim 9, wherein the second edge determination unit determines each step edge region to be a strong step edge region when a difference value among the neighboring pixels within the corresponding step edge region is greater than a fixed value, and to be a weak step edge region when the difference value among the neighboring pixels within the corresponding step edge region is less than the fixed value.

11. The image sensing device of claim 9, wherein the second edge determination unit determines each texture edge region to be a strong texture edge region when a difference value among the neighboring pixels within the corresponding texture edge region is greater than the fixed value, and to be a weak texture edge region when the difference value among the neighboring pixels within the corresponding texture edge region is less than the fixed value.

12. The image sensing device of claim 9, wherein the noise removing unit removes noise from each texture edge region using a high-gain high-frequency filter, and removes noise from each step edge region using a low-gain high-frequency filter.

13. The image sensing device of claim 12, wherein the low-gain high-frequency filter increases a sharpness strength by subtracting a blurring signal from an original image signal.

14. The image sensing device of claim 13, wherein the blurring signal is generated using an average value of the neighboring pixels having a direction that is different than a direction of the corresponding step edge region.

15. An operation method of an image sensing device, comprising:
determining each of multiple regions in a pixel array to be an edge region when a standard deviation of the pixel data of neighboring pixels within the corresponding region is greater than a reference value, and to be a flat region when the standard deviation of the pixel data of the neighboring pixels within the corresponding region is less than the reference value;
determining each edge region to be a step edge region when a total number of directional changes in the corresponding edge region is less than a set value, and to be a texture edge region when the total number of direction changes in the corresponding edge region is greater than the set value; and
removing noise from each step edge region using a first filter and for removing noise from each texture edge region using a second filter having a different gain than that of the first filter.

16. The operation method of claim 15, further comprising determining each step edge region to be a strong step edge region when a difference value among the neighboring pixels within the corresponding step edge region is greater than a fixed value, and to be a weak step edge region when the difference value among the neighboring pixels within the corresponding step edge region is less than the fixed value.

17. The operation method of claim 15, further comprising determining each texture edge region to be a strong texture edge region when a difference value among the neighboring pixels within the corresponding texture edge region is greater than the fixed value, and to be a weak texture edge region when the difference value among the neighboring pixels within the corresponding texture edge region is less than the fixed value.

18. The operation method of claim 15, wherein in removing noise, noise is removed from each texture edge region using a high-gain high-frequency filter and noise is removed from each step edge region using a low-gain high-frequency filter.

19. The operation method of claim 18, wherein the low-gain high-frequency filter increases sharpness strength by subtracting a blurring signal from an original image signal.

20. The operation method of claim 19,
   wherein each edge region is associated with at least one of horizontal direction information, vertical direction information, diagonal left direction information and diagonal right direction information, and
   wherein the blurring signal is generated using an average value of the neighboring pixels having a direction that is different than a direction of the corresponding step edge region.

\* \* \* \* \*